Patented Feb. 12, 1952

2,585,479

UNITED STATES PATENT OFFICE 2,585,479

PRODUCTION OF OLEFIN OXIDES

Norman Levy, Norton-on-Tees, England, assignor to Imperial Chemical Industries Limited, a corporation of Great Britain No Drawing. Application December 28, 1949, Serial No. 135,530. In Great Britain January 13, 1949

10 Claims. (Cl. 260—348.5)

1

This invention relates to the production of ethylene oxide.

It has already been proposed to produce ethylene oxide by the reaction of ethylene with an oxygen-containing gas in the presence of a catalyst containing silver, the temperature being in the range of from 150° C. to 400° C.

In co-pending British application No. 960/49, a process is described for the production of ethylene oxide in which the conversion of the ethylene and the yield of ethylene oxide are enhanced by providing in the silver-containing catalyst for the presence of fused silica, quartz, or a silicate glass, preferably in powdered form. Furthermore, in co-pending British application No. 959/49 there is described a process for the production of ethylene oxide in which the silver-containing catalyst also contains fused sodium aluminium silicate, which may be in powdered form.

I have now found that when using, in the powdered form, additive materials of the type described in co-pending applications Nos. 960/49 and 959/49, the degree of fineness has a profound influence on the conversion of ethylene and on the yield of ethylene oxide.

According to the present invention, therefore, there is provided a process for the production of ethylene oxide by reacting ethylene with oxygen-containing gas in the presence of a silver-containing catalyst in which the silver-containing catalyst also contains silica, quartz, or a silicate, which has a particle size of less than 100µ. Preferably the catalyst is a reduced silver oxide.

Powdered material suitable for use according to the present invention may be obtained by grinding the selected material so that it passes through a 200 mesh British Standard fine sieve (76µ), and even better results are obtained if a 300 mesh British Standard fine sieve, i. e., one having apertures of 53µ, is used.

Suitable additive materials for use according to the present invention are fused silica, quartz, refractory silicate materials, and silicate glasses, for example boro-silicates obtained by crushing a glass which is sold under the registered trade name "Pyrex." Particularly satisfactory results are obtained when the silicate is fused sodium aluminium silicate.

When fused sodium aluminium silicate is employed the relative proportions of silica and sodium oxide are preferably from 2 to 6 moles and from 0.5 to 3 moles respectively per mole of alumina. Fused sodium aluminium silicate is to be understood to mean fused, semi-fused or sintered materials containing predominantly the

2 oxides of sodium, aluminium and silicon over a wide range of proportions. Suitable temperatures for the production of the fused sodium aluminate are within the range 800° C. to 1500° C.

The catalyst may be supported or unsupported. It may be supported, for example on fused aluminium silicate or on firebrick or similar material, preferably having a particle size in the range $\frac{1}{16}$" to $\frac{1}{2}$". In these cases, in order to give the required activity and specificity it is desirable that the powdered material should be present in a proportion of from 0.5 to 50%, and preferably from 0.5 to 10% by weight of the active ingredient calculated as silver oxide $(Ag_2O)$. If unsupported the active ingredient of the catalyst should be mixed with the powdered material, for example by mixing them together using methanol, and preferably acetone as pasting medium.

The process may be carried out within a wide range of temperature, for example between 150° and 400° C. In general an increase in temperature is accompanied by an increase in the conversion of ethylene and a decrease in the yield of ethylene oxide. It is preferred to carry out the reaction in the temperature range of 200° to 300° C.

If desired the process may be carried out at elevated pressure, for example up to 50 atmospheres gauge, although satisfactory results are obtained at atmospheric pressure. If superatmospheric pressure is used it is preferred to employ less than 20 atmospheres gauge.

It is convenient to use air as the oxygen containing gas but a reaction mixture containing concentrations of oxygen other than that given by the addition of air to the ethylene to be reacted may be used, for example inert gaseous diluents such as nitrogen may be provided in the reaction mixture. The proportion of ethylene in the initial gaseous reaction mixture may be within a wide range: satisfactory results have been obtained at moderate pressures with mixtures containing up to 20% by volume of ethylene. Similarly, the proportion of oxygen in the reaction mixture may be in a wide range, proportions up to 20% by volume having given satisfactory results. It is preferred to use an oxygen/ethylene molar ratio at least equal to 1.0. It is desirable to exercise careful control of temperature when using reactant mixtures having a composition falling within the explosive range.

Improved results are obtained by dispersing or pasting the catalyst with an organic liquid such as methanol, and preferably with acetone. In starting up the process a suitable procedure is to charge the reactor with catalyst still wet with acetone and to pass air, an inert gas or the reaction mixture itself through the catalyst and then to pass the reaction mixture through and maintain the temperature within the desired range.

The following record of experiments shows the beneficial results obtained when operating according to the process of the present invention. The gas volume was measured at N. T. P.

20 parts by weight of silver oxide were mixed to a thin paste with acetone, and this was applied to 78 parts by weight of firebrick granules of 1/8" to 1/4" particle size. 2% by weight of the additives indicated in the table given below were mixed with the granules, and these were charged into a reaction chamber through which air at 100° C. was passed to remove residual acetone. Reaction gas containing by volume, 2.5% ethylene, 10% oxygen, and 87.5% nitrogen, was passed through the reaction chamber at a space velocity of 250 volumes per volume of catalyst space per hour, the temperature being maintained at 230° C.

| Additive | Percent conversion | Percent yield |
|---|---|---|
| Nil | 52 | 65 |
| Silica (76μ) | 83 | 65 |
| Precipitated sodium aluminium silicate (<53μ) | 90 | 62 |
| Fused sodium aluminium silicate (<53μ) | 95 | 64 |

I claim:

1. A process for the production of ethylene oxide which comprises reacting in the vapor phase at a temperature of 150° to 400° C. a mixture of ethylene and an oxygen containing gas in which the proportion by volume of ethylene is up to 20% and of oxygen is up to 20%, the molar ratio of oxygen to ethylene in the mixture being at least 1:1, in the presence of a silver-containing catalyst comprising separately prepared silver oxide in intimate admixture with from 0.5 to 50% of its own weight of a powdered material selected from the group consisting of silica, quartz and a silicate and having a particle size of less than 100μ, which powdered material is included within the intrinsic physical structure of the catalyst.

2. A process as claimed in claim 1 wherein the catalyst is supported on a carrier.

3. A process as claimed in claim 1 wherein the proportion of the said powdered material is from 0.5 to 10% of the silver oxide by weight.

4. A process as set forth in claim 1 wherein the particle size of said powdered material is less than 53μ.

5. A process as set forth in claim 1 wherein said silicon containing compound is fused sodium aluminum silicate.

6. A process as set forth in claim 1 wherein the silicon-containing compound is a boro-silicate glass.

7. A process as set forth in claim 1 wherein the silver-containing compound is unsupported.

8. A process as set forth in claim 1 wherein the temperature employed is within the range of from 200° to 300° C.

9. A process as set forth in claim 1 wherein the vapor phase reaction is carried out at atmospheric pressure.

10. A process as set forth in claim 1 wherein the vapor phase reaction is carried out at a superatmospheric pressure of less than 20 atmospheres gauge.

NORMAN LEVY.

REFERENCES CITED

The following references are of record in the file of this patent:

UNITED STATES PATENTS

| Number | Name | Date |
|---|---|---|
| 69,315 | Cheney | Oct. 1, 1867 |
| 2,142,948 | Law | Jan. 31, 1939 |
| 2,279,469 | Law | Apr. 14, 1942 |
| 2,393,240 | Dreyfus | Jan. 22, 1946 |
| 2,424,084 | Finch | July 15, 1947 |
| 2,430,443 | Becker | Nov. 11, 1947 |
| 2,458,266 | Heider | Jan. 4, 1949 |
| 2,464,812 | Johnson | Mar. 22, 1949 |

FOREIGN PATENTS

| Number | Country | Date |
|---|---|---|
| 500,382 | Great Britain | Jan. 11, 1938 |